US011288262B2

(12) United States Patent
Dueck

(10) Patent No.: US 11,288,262 B2
(45) Date of Patent: Mar. 29, 2022

(54) METHODS, SYSTEMS, AND COMPUTER READABLE MEDIA FOR RECYCLING ORDER IDENTIFIERS

(71) Applicant: Oracle International Corporation, Redwood Shores, CA (US)

(72) Inventor: Brian James Dueck, Collingwood (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 332 days.

(21) Appl. No.: 16/443,400

(22) Filed: Jun. 17, 2019

(65) Prior Publication Data

US 2020/0394180 A1    Dec. 17, 2020

(51) Int. Cl.
  *G06F 16/23*  (2019.01)
  *G06F 16/22*  (2019.01)
  *G06F 16/27*  (2019.01)

(52) U.S. Cl.
  CPC ...... *G06F 16/2379* (2019.01); *G06F 16/2272* (2019.01); *G06F 16/278* (2019.01)

(58) Field of Classification Search
  CPC .................................................. G06F 16/2379
  See application file for complete search history.

(56) References Cited

U.S. PATENT DOCUMENTS

| | | |
|---|---|---|
| 5,369,570 A | 11/1994 | Rad |
| 6,571,215 B1 | 5/2003 | Mahapatro |
| 6,662,191 B1 | 12/2003 | Cherniavsky et al. |
| 7,096,189 B1 | 8/2006 | Srinivasan |
| 7,171,375 B2 | 1/2007 | Clarke |
| 7,330,822 B1 | 2/2008 | Robson et al. |
| 7,496,912 B2 | 2/2009 | Keller et al. |
| 8,024,707 B2 | 9/2011 | Manglik et al. |
| 8,719,826 B2 | 5/2014 | Baeuerle et al. |
| 9,715,675 B2 | 7/2017 | Chakravarty et al. |

(Continued)

OTHER PUBLICATIONS

"Example of Managing Transaction IDs," https://gpdb.docs.pivotal.io/5160/admin_guide/intro/mvcc_example.html, Pivotal Greenplum, v5.16, pp. 1-2 (Coyright 2019).

(Continued)

*Primary Examiner* — Van H Oberly
(74) *Attorney, Agent, or Firm* — Jenkins, Wilson, Taylor & Hunt, P.A.

(57) ABSTRACT

Methods, systems, and computer readable media for recycling order identifiers are disclosed. According to one method, the method occurs at an order management system that utilizes an order database. The order management system includes at least one processor and a memory. The method includes selecting, using an order block data structure, an order slot identifier from a range of order slot identifiers usable in a database partition of the order database, wherein the order slot identifier is reusable; storing order data for an order in the database partition using the order slot identifier; purging the order data in the database partition; and modifying, periodically or aperiodically, the order block data structure to indicate that the order slot identifier is available for reuse, wherein the order block data structure indicates a recycle count associated with usage.

18 Claims, 6 Drawing Sheets

(56) References Cited

U.S. PATENT DOCUMENTS

| | | | |
|---|---|---|---|
| 9,996,870 | B2 | 6/2018 | Dueck et al. |
| 2009/0177563 | A1* | 7/2009 | Bernstein ............... G06Q 20/04 705/30 |
| 2012/0109665 | A1 | 5/2012 | Knutson et al. |
| 2012/0150582 | A1 | 6/2012 | Dueck |
| 2012/0150676 | A1 | 6/2012 | Dueck et al. |
| 2013/0085587 | A1 | 4/2013 | Gentile |
| 2013/0226866 | A1 | 8/2013 | Sebastian |
| 2014/0372702 | A1 | 12/2014 | Subramanyam et al. |
| 2016/0125510 | A1 | 5/2016 | Dueck et al. |
| 2016/0232595 | A1 | 8/2016 | Corlett et al. |

OTHER PUBLICATIONS

"How to reclaim space in InnoDB when innodb_file_per_table is ON," https://www.percona.com/blog/2013/09/25/how-to-reclaim-space-in-innodb-when-innodb_file_per_table-is-on/, pp. 1-3 (Copyright 2019).

"PURGE_PARTITION," Vertica Analytics Platform Version 9.2.x Documentation, https://www.vertica.com/docs/9.2.x/HTML/Content/Authoring/SQLReferenceManual/Functions/VerticaFunctions/PartitionManagement/PURGE_PARTITION.htm, pp. 1-4 (Copyright 2019).

Okamoto, "Automatically reclaim unused space from partitioned InnoDB reporting.event tables," https://communities.ca.com/ideas/235741102-automatically-reclaim-unused-space-from-partitioned-innodb-reportingevent-tables, pp. 1-4 (Oct. 22, 2018).

Little, "Partitioned Tables: Rolling/Rotating/Round-Robining Partitions," https://sqlworkbooks.com/2018/03/partitioned-tables-rolling-rotating-round-robining-partitions/, pp. 1-3 (Mar. 26, 2018).

Sundar, "Implementation of Sliding Window Partitioning in SQL Server to Purge Data," https://www.mssqltips.com/sqlservertip/5296/implementation-of-sliding-window-partitioning-in-sql-server-to-purge-data/, pp. 1-10 (Feb. 22, 2018).

"Database Purging or Clean Up Guidelines," https://docs.tibco.com/pub/af/4.0.0/doc/html/GUID-35AD606C-9F8C-493A-9A46-8175B12E139F.html, p. 1 (Jul. 2017).

"Unload Data and Manage Partitions for IBM DB2 Warehouse Repository," CA Compliance Event Manager—5.0, https://docops.ca.com/ca-compliance-event-manager/5-0/en/maintaining/unload-data-and-manage-partitions-for-IBM-db2-warehouse-repository, pp. 1-3 (Nov. 8, 2016).

"How can I delete a database record and reuse the deleted primary key?," https://stackoverflow.com/questions/37965606/how-can-i-delete-a-database-record-and-reuse-the-deleted-primary-key, pp. 1-2 (Jun. 22, 2016).

"Order Purging Through Java," https://docs.tibco.com/pub/af/3.0.2/doc/html/GUID-6BD56F6A-8425-48DC-B450-AB64A4555FAB.html, p. 1 (Jun. 2016).

"How to Purge Sale Order Records in Order Management," https://madhappan.blogspot.com/2013/06/how-to-purge-sale-order-records-in.html, pp. 1-5 (Jun. 12, 2013).

"Tivoli Data Warehouse range partitioning," IBM Tivoli Monitoring, Version 6.3, https://www.ibm.com/support/knowledgecenter/SS4EKN_7.2.0/com.ibm.itm.doc_6.3/install/tdw_rangepart.htm, pp. 1-3 (Jun. 2013).

"Reuse an identity field value after deleting rows," https://www.daniweb.com/programming/databases/threads/426476/reuse-an-identity-field-value-after-deleting-rows, pp. 1-2 (2013).

"How to reuse deleted primary keys in mysql?," https://stackoverflow.com/questions/2285906/how-to-reuse-deleted-primary-keys-in-mysql, p. 1 (2010).

Advisory Action, Applicant-Initiated Interview Summary, Examiner-Initiated Interview Summary, and AFCP 2.0 Decision for U.S. Appl. No. 14/619,906 (dated Nov. 19, 2019).

Final Office Action for U.S. Appl. No. 14/619,906 (dated Aug. 8, 2019).

Applicant-Initiated Interview Summary for U.S. Appl. No. 14/619,906 (dated May 3, 2019).

Non-Final Office Action for U.S. Appl. No. 14/619,906 (dated Mar. 25, 2019).

Advisory Action and Applicant-Initiated Interview Summary for U.S. Appl. No. 14/619,906 (dated Sep. 14, 2018).

Final Office Action for U.S. Appl. No. 14/619,906 (dated May 31, 2018).

Notice of Allowance and Fee(s) Due for U.S. Appl. No. 14/530,172 (dated Jan. 26, 2018).

Advisory Action for U.S. Appl. No. 14/530,172 (dated Oct. 27, 2017).

Applicant Initiated Interview Summary for U.S. Appl. No. 14/530,172 (dated Oct. 26, 2017).

Examiner-Initiated Interview Summary for U.S. Appl. No. 14/619,906 (dated Oct. 18, 2017).

Final Office Action for U.S. Appl. No. 14/530,172 (dated Aug. 23, 2017).

Non-Final Office Action for U.S. Appl. No. 14/619,906 (dated Jun. 26, 2017).

Applicant Initiated Interview Summary for U.S. Appl. No. 14/530,172 (dated May 31, 2017).

Non-Final Office Action for U.S. Appl. No. 14/530,172 (dated Feb. 23, 2017).

"Oracle® Communications Order and Service Management Concepts," Release 7.2.2, E35415-02, pp. 1-348 (Mar. 2013).

"Oracle® Application Integration Architecture," Release 11.1, E22651-03, pp. 1-416 (May 2012).

* cited by examiner

| ORDER SLOT ID | ORDER STATUS | CREATION DATE | LAST MODIFIED DATE |
|---|---|---|---|
| 1 | 7 | 03/05/2019 12:14:34 | 03/09/2019 14:04:11 |
| 2 | 4 | 03/05/2019 12:24:59 | 03/12/2019 15:14:23 |
| 999999 | 7 | 04/06/2019 08:22:47 | 04/22/2019 15:09:17 |
| 1000000 | 4 | 04/06/2019 08:24:38 | 04/19/2019 13:15:51 |

200

| ORDER SLOT ID | ORDER STATUS | CREATION DATE | LAST MODIFIED DATE |
|---|---|---|---|
| 1000001 | 4 | 04/06/2019 08:34:30 | 05/02/2019 18:04:10 |
| 1000002 | 4 | 04/06/2019 08:34:55 | 05/11/2019 17:14:43 |
| 1999999 | 4 | 05/08/2019 10:12:41 | 05/22/2019 15:09:17 |
| 2000000 | 4 | 05/08/2019 10:13:28 | 05/19/2019 13:15:51 |

202

| ORDER SLOT ID | ORDER STATUS | CREATION DATE | LAST MODIFIED DATE |
|---|---|---|---|
| 2000001 | 4 | 05/08/2019 10:14:30 | 05/08/2019 10:14:30 |
| 2000002 | 4 | 05/08/2019 11:34:45 | 05/10/2019 14:22:35 |
| [2999999] | | | |
| [3000000] | | | |

502 — PURGE ORDERS FROM A DATABASE PARTITION

504 — IDENTIFY A RANGE OF ORDER SLOT IDENTIFIERS THAT IS AVAILABLE FOR USE

506 — CREATE OR MODIFY A DATA ENTRY IN AN ORDER BLOCK DATA STRUCTURE TO INDICATE THAT THE RANGE OF ORDER SLOT IDENTIFIERS IS AVAILABLE FOR USE, WHEREIN THE DATA ENTRY INCLUDES A RECYCLE COUNT INDICATING THE NUMBER OF TIMES THAT THE RANGE HAS BEEN (RE)USED

602 — SELECT, USING AN ORDER BLOCK DATA STRUCTURE, AN ORDER SLOT IDENTIFIER FROM A RANGE OF ORDER SLOT IDENTIFIERS USABLE IN A DATABASE PARTITION OF THE ORDER DATABASE, WHEREIN THE ORDER SLOT IDENTIFIER IS REUSABLE

604 — STORE ORDER DATA FOR AN ORDER IN THE DATABASE PARTITION USING THE ORDER SLOT IDENTIFIER

606 — PURGE THE ORDER DATA IN THE DATABASE PARTITION

608 — MODIFY, PERIODICALLY OR APERIODICALLY, THE ORDER BLOCK DATA STRUCTURE TO INDICATE THAT THE ORDER SLOT IDENTIFIER IS AVAILABLE FOR REUSE, WHEREIN THE ORDER BLOCK DATA STRUCTURE INDICATES A RECYCLE COUNT ASSOCIATED WITH USAGE

FIG. 6

METHODS, SYSTEMS, AND COMPUTER READABLE MEDIA FOR RECYCLING ORDER IDENTIFIERS

TECHNICAL FIELD

The subject matter described herein relates to a computerized order database system. More particularly, the subject matter described herein relates to systems, methods, and computer readable media for recycling order identifiers.

BACKGROUND

At present, computerized order management systems are being employed in a number of industries to conduct order entry and order fulfillment tasks. For example, order entry may involve the process of electronically receiving orders and entering the orders into an order management system. In this example, the entered orders may be stored as record entities within the order management system for subsequent electronically fulfillment. In many instances, orders can contain data regarding one or more products (e.g., goods and/or services), pricing of the one or more products, and one or more offers related to the one or more products. Likewise, order fulfillment may include electronically fulfilling the orders after the orders have been entered into the order management system.

Order management systems may store orders in a database and assign unique identifiers (IDs) to them for processing and data lookup or retrieval. Orders may be assigned to database partitions, where each partition may include a range of order IDs, e.g., partition 1 may include order identifiers 1-1,000,000, partition 2 may include order IDs 1,000,001-2,000,000, etc. As orders are continually created, range based partitions can fill up thus requiring new partitions to be created periodically. Each new partition will be associated with a higher range of order IDs. As orders complete their lifecycle they are purged from the database and eventually the partition can be dropped to reclaim storage space for use by new partitions. The whole lifecycle requires very careful partition maintenance, which if not performed properly or in a timely basis can result in a reduction in performance (e.g., poorly sized partitions or index stats issues in new partitions), higher operational costs (e.g., poor performance and using more database disk space than required), and even system instability (e.g., index corruption issues due to partition drops).

Accordingly, there exists a need for systems, methods, and computer readable media for recycling order identifiers.

SUMMARY

Methods, systems, and computer readable media for recycling order identifiers are disclosed. According to one method, the method occurs at an order management system that utilizes an order database. The order management system includes at least one processor and a memory. The method includes selecting, using an order block data structure, an order slot identifier from a range of order slot identifiers usable in a database partition of the order database, wherein the order slot identifier is reusable; storing order data for an order in the database partition using the order slot identifier; purging the order data in the database partition; and modifying, periodically or aperiodically, the order block data structure to indicate that the order slot identifier is available for reuse, wherein the order block data structure indicates a recycle count associated with usage.

One system includes at least one processor and a memory. The system also includes an order management system (OMS) that utilizes an order database, wherein the OMS is implemented using the at least one processor and the memory, wherein the OMS is configured for: selecting, using an order block data structure, an order slot identifier from a range of order slot identifiers usable in a database partition of the order database, wherein the order slot identifier is reusable; storing order data for an order in the database partition using the order slot identifier; purging the order data in the database partition; and modifying, periodically or aperiodically, the order block data structure to indicate that the order slot identifier is available for reuse, wherein the order block data structure indicates a recycle count associated with usage.

The subject matter described herein may be implemented in hardware, software, firmware, or any combination thereof. As such, the terms "function", "engine", "node" or "module" as used herein refer to hardware, software and/or firmware components for implementing the feature(s) being described. In one example implementation, the subject matter described herein may be implemented using a non-transitory computer readable medium having stored thereon computer executable instructions that when executed by the processor of a computer cause the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 2 is a diagram illustrating example database partitions containing order data;

FIG. 5 is a diagram illustrating an example process for purging orders; and

FIG. 6 is a flow chart illustrating an example process for recycling order identifiers.

DETAILED DESCRIPTION

Figure 1:
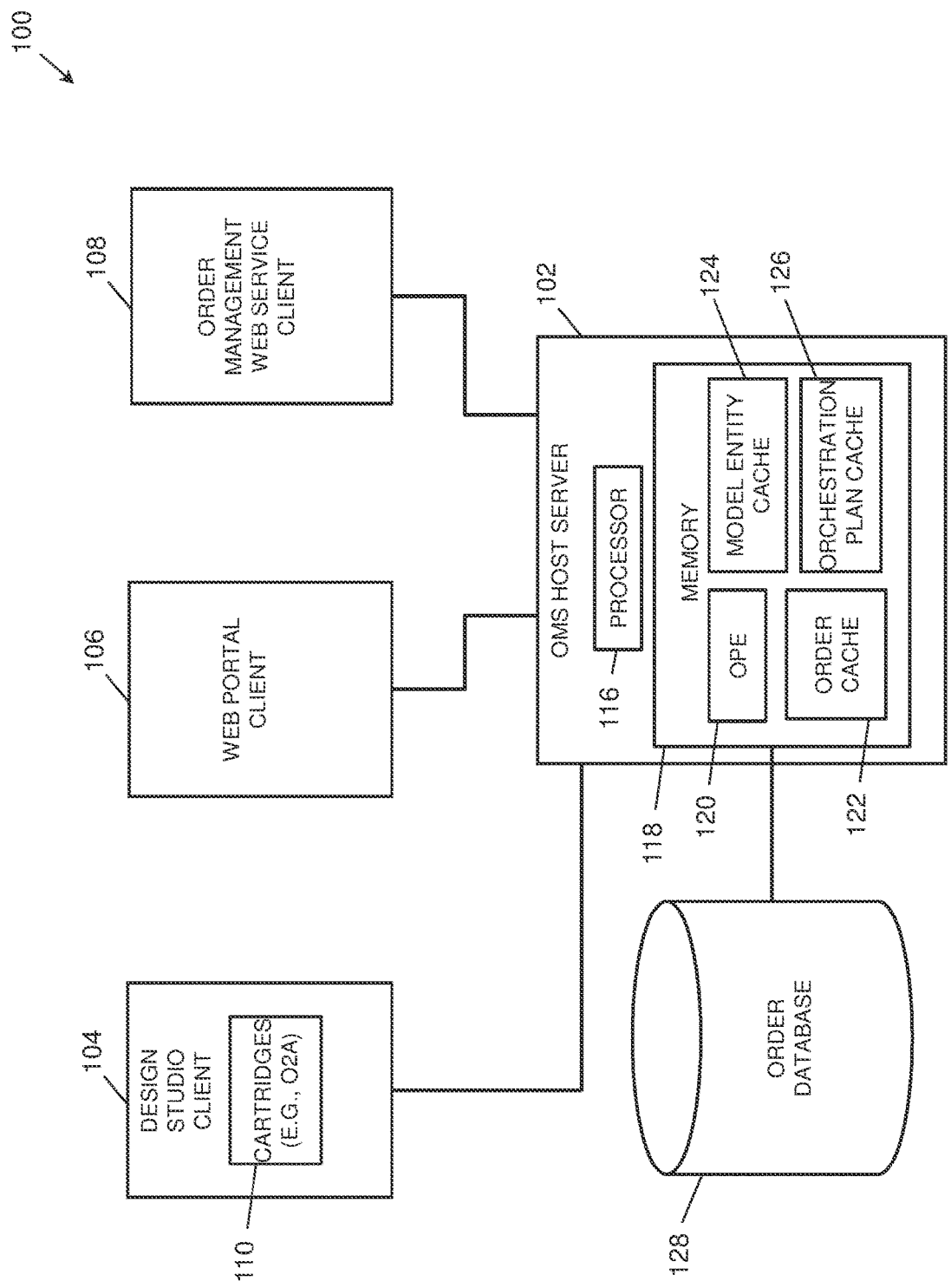
FIG. 1 is a block diagram illustrating an example architecture for order management system.

The subject matter described herein relates to methods, systems, and computer readable media for recycling order identifiers. Order management systems may utilize database partitions based on ranges of a partitioning key. For example, an order management database may support partitioning (e.g., dividing) a database object (e.g., tables, indexes, etc.) into smaller partitions (e.g., portions) for ease of manageability but still allows the database partitions to function as a single logical object. In this example, orders may be assigned to database partitions related to an order table, where each partition may include a range of order IDs, e.g., partition 1 may include order IDs 1-1,000,000, partition 2 may include order IDs 1,000,001-2,000,000, etc. As orders are continually created, range based partitions can fill up thus requiring new partitions to be created periodically. Each new partition will be associated with a higher range of order IDs. As orders complete their lifecycle they are purged from the database and eventually the partition can be dropped to reclaim storage space, which can be used by new partitions. The whole lifecycle requires very careful partition maintenance, which if not performed properly or in a timely basis can result in a reduction in performance (e.g., poorly sized partitions or index stats issues in new partitions), higher operational costs (e.g., poor performance and using more database disk space than required), and even system instability (e.g., index corruption issues caused due to partition drops).

Partition management (e.g., adding, dropping, and/or consolidating partitions) normally requires the order management system to either be taken offline or put into a reduced level of operation so that the database is not taxed. When the order management system is brought back online, care must be taken to ensure indexes have not been rendered unusable due to the partition management. To reduce the frequency of partition management, some customers opt to create partitions with very large ranges. However, large partitions may require large amounts of disk space which can inflate the operating cost of the system and can limit scalability.

In accordance with some aspects of the subject matter described herein, methods, mechanisms, and/or techniques for recycling order identifiers are provided. For example, an order management system or a related entity in accordance with various aspects described herein may recycle or reuse order database partitions by reusing order slot IDs that act as partitioning keys. In this example, in contrast to a conventional order database that contains unique order IDs, order slot IDs may be used by the order management system, where each order slot ID may represent a row, a slot, or a data location that can store order details. While an order slot ID can refer to a particular order for some amount of time (e.g., until this order is purged), eventually the same order slot ID may be used to store order data for a different, newer order. As such, in such environments, an order management system or a related entity may store and utilize other information in addition to order slot IDs to uniquely identify orders, particularly past completed orders.

In accordance with some aspects of the subject matter described herein, methods, mechanisms, and/or techniques for partition maintenance may be performed using an order block data structure. For example, an order block data structure may track ranges of available order slot IDs along with additional information (e.g., recycle counts indicating (re)use and block IDs for the ranges), where this information may be usable for uniquely identifying orders. In this example, an order management system or a related entity can consult the order block data structure to select an available order slot ID and/or to generate or derive external order numbers, e.g., using a recycle count and an order slot ID. In some embodiments, the order block data structure may be updated periodically (e.g., every Sunday) or aperiodically (e.g., when the workload is below a threshold value), e.g., as part of partition maintenance or a database purge process.

Advantageously, by reusing order slot IDs and using an order block data structure to track usage of the order slot IDs, conventional partition management may be mitigated or avoided, thereby resulting in lower cost of ownership and may improve customer experience. Moreover, such environments can reduce operational complexity that may result in poor performance and can substantially eliminate a leading cause of planned and unplanned downtime. For example, an order management system in accordance with various aspects described herein may reduce or mitigate operational challenges with conventional partition maintenance (e.g., adding, dropping, and/or consolidating partitions) by allowing partitions to be reused. In contrast to an environment where each order ID uniquely identifies an order in a deployment, the role of order IDs may be redefined or repurposed to serve as data locations or slots in this example order management system, hence the term order slot IDs. In this example order management, an order slot ID may not (on its own) refer to a unique order externally, but may uniquely refer to an active (e.g., non-purged) order internally. However, once an order is purged, its related order slot ID can be re-used while keeping track of the number of times it has been re-used using a recycle count.

Reference will now be made in detail to various embodiments of the presently disclosed subject matter, examples of which are illustrated in the accompanying drawings. Wherever possible, the same reference numbers will be used throughout the drawings to refer to the same or like parts. Various embodiments of the present subject matter are disclosed and described herein.

FIG. 1 is a block diagram illustrating an example architecture for an order management system (OMS) 100 according to an example of the subject matter described herein. Referring to FIG. 1, OMS 100 may include an OMS host server 102 that is communicatively connected to a design studio client 104, web portal client 106, an order management web service client 108, and/or an order database 128. Notably, each of OMS host server 102 and clients 104-108 may comprise a special purpose computer device or machine that includes hardware components (e.g., one or more processor units, memory, and network interfaces) configured to execute software elements (e.g., applications, cartridges, modules, etc.) for the purposes of performing one or more aspects of the disclosed subject matter herein. In addition, it should be noted that OMS host server 102 and its components and functionality described herein constitute a special purpose computer that improves the technological field pertaining to order management systems by providing mechanisms and/or methods for recycling order identifiers, thereby improving resource utilization, e.g., reduced storage requirements and reduced storage/database maintenance.

In some embodiments, design studio client 104 includes an OMS client machine that is provisioned with one or more cartridges 110. In particular, design studio client 104 may be configured to generate one or more cartridges 110 (e.g., software-based cartridges executable on one or more processors) that are compatible with OMS host server 102 or another entity. For example, cartridges 110 may include an order-to-activate (O2A) cartridge for performing various tasks and/or storing metadata associated with order-to-activate process in OMS 100, e.g., from order creation to service activation. In this example, O2A cartridge may include product specification definitions including fulfillment metadata (e.g., dependency relationships) and order line to fulfillment pattern mapping usable for generating orchestration plans. As used herein, cartridges 110 generated by design studio client 104 may include any software package, application, or module that is executable by a host server and contains configuration data that defines various policies (e.g., remedial operations and rules) for managing and/or generating orchestration plans associated with customer orders. Notably, the configuration data and associated metadata enables a recipient host server, such as OMS host server 102, to process, manage, and execute orders and/or generate and execute orchestration plans in accordance with the defined policies. After generating cartridges 110, design studio client 104 may be further configured to send cartridges 110 to OMS host server 102 for provisioning.

As indicated above, OMS 100 may include OMS host server 102, which is communicatively connected (e.g., via a local network or the Internet) to each of OMS clients 104-108. OMS clients 104-108 may represent various client entities that allow OMS operators or other users to communicate with OMS 100 or entities therein. For example, OMS clients 104-108 may allow users to send orders or related information to OMS host server 102 for processing.

In some embodiments, OMS host server 102 may include a processor 116 (which may be operatively coupled to a bus) for processing information and executing instructions or operations. Processor 116 may be any type of processor, such as a central processing unit (CPU), a microprocessor, a multi-core processor, and the like. OMS host server 102 further includes a memory 118 for storing information and instructions to be executed by processor 116. In some embodiments, memory 118 may comprise one or more of random access memory (RAM), read only memory (ROM), static storage such as a magnetic or optical disk, or any other type of machine or non-transitory computer-readable medium. OMS host server 102 may further include a communication device (not shown), such as a network interface card or other communications interface, configured to provide communications access to clients 104-108. In some embodiments, memory 118 may be utilized to store an order processing engine (OPE) 120, order cache 122, a model entity cache 124, and an orchestration plan cache 126.

In some embodiments, OMS host server 102 may receive a number of orders submitted from a client entity (e.g., OMS clients 104-108), either directly from the client entity or via an order capture system (not shown). For example, the received orders may comprise one or more central order management (COM) orders that identify one or more products and/or services (e.g., telecommunications services, network services, wireless communications services, etc.) requested by the client entity. In some embodiments, the order capture system may comprise a computer system configured to receive COM orders submitted by requesting client entities and to subsequently forward the orders to OMS host server 102 for processing. For example, OMS host server 102 may be configured to utilize OPE 120 to process the received COM orders.

Model entity cache 124 may represent any suitable entity (e.g., a storage device or memory) for storing order fulfillment metadata and/or modeled orchestration plans associated with cartridges 110 (e.g., O2A cartridge). For example, a modeled orchestration plan may be a static and/or predefined orchestration plan based on metadata, dependencies, and/or other information in cartridges 110. In this example, model entity cache 124 may include a number of modeled orchestration plans, where each modeled orchestration plan may represent an idealized order fulfillment plan with typical or standard dependencies between model order elements based on orders for tasks, services, or offers defined in cartridges 110.

Orchestration plan cache 126 may represent any suitable entity (e.g., a storage device or memory) for storing run-time orchestration plans and/or related information. For example, a run-time orchestration plan may be a dynamic orchestration plan based on a modeled orchestration plan but may be augmented and/or modified to include or remove dependencies and/or order elements for representing an actual customer order submitted at run-time.

Order database 128 may represent any suitable entity (e.g., a storage device, a database management system (DBMS), and/or memory) for storing orders and/or related information. For example, database 128 may be an organized collection of structured data stored electronically in a computer system. In this example, the database may be controlled by a database management system (DBMS), e.g., Oracle DBMS, MySQL DBMS, etc. In some embodiments, database 128 may refer to a DBMS, stored data therein, and/or applications that are associated with accessing or modifying the stored data.

In some embodiments, database 128 may store or present data as rows and columns in one or more tables or database partitions (e.g., shards, range based partitions, table portions, etc.) to make processing and data querying efficient. In such embodiments, data may be easily accessed, managed, modified, updated, controlled, and organized via one or more database languages, e.g., structured query language (SQL).

In some embodiments, OMS host server 102 may initially store the received orders in order database 128. Afterwards, OMS host server 102 may employ OPE 120 to access order database 128 to retrieve and store the COM orders in memory 118 (e.g., order cache 122). The orders contained in order cache 122 may then be processed by OPE 120 in accordance with relevant orchestration plans and/or using rules and policies set forth in model entity cache 124. In some embodiments, order cache 122 may contain any type of inbound and/or outbound order including, but not limited to customer orders, provisioning orders, billing orders, and inventory orders. Order cache 122 may also include COM orders, service order management orders (i.e., SOM orders), and/or other orders managed and processed by OMS host server 102.

In some embodiments, OPE 120 may represent any suitable entity or entities (e.g., a computing platform, software executing on a processor, a logic device, an ASIC, and/or an FPGA) for processing orders. For example, OPE 120 may be configured to process and manage several heterogeneous types of orders (i.e., different types of orders) stored in order cache 122. In some embodiments, OPE 120 may comprise a software algorithm (executable by one or more processors) that is configured to receive and process various types of orders.

In some embodiments, OMS 100, OMS host server 102, OPE 120, or another entity may perform one or more aspects associated with recycling or reusing database partitions storing order data. For example, OMS 100, OMS host server 102, OPE 120, or another entity may select, using an order block data structure, an order slot ID from a range of order slot identifiers usable for storing order data in a database partition of order database 128. After storing order data using the order slot ID, the order data may be backed up and/or purged from the database partition and the order slot ID may be reclaimed for reuse by OMS 100, OMS host server 102, OPE 120, or another entity.

In some embodiments, OMS 100, OMS host server 102, OPE 120, or another entity may maintain an order block data structure, e.g., in order database 128 and/or order cache 122. For example, an order block data structure may include data entries, where each data entry may represent a unique range of order slot identifiers, a recycle count associated with a number of times the range has been used or reused, and, optionally, a block ID associated with the range. In this example, the order block data structure may be updated to maintain information about available order slot IDs including, for example, the number of times an order slot ID or its related range has been (re)used. In some embodiments, updating an order block data structure or data entry therein may occur when an order slot ID is selected for use and/or after an order is completed or deemed inactive (and is to be backed up and/or purged from a partition).

In some embodiments, OMS 100, OMS host server 102, OPE 120, or another entity may use an order block data structure in generating or deriving an external order number. For example, an external order number may be based on data values that uniquely identifies an order. In this example, when external order number is requested, OMS 100, OMS host server 102, OPE 120, or another entity may prepend a block ID, a recycle count to a related order slot ID to generate an external order number. In another example, an external order number may be based on concatenating bit values associated with a block ID, a recycle count, and an order slot ID.

In some embodiments, orders may be purged for various reasons and/or based on various factors. For example, OMS 100, OMS host server 102, OPE 120, or another entity may purge orders after order completion, after backup, after an amount of time of order inactivity (e.g., staleness), after order cancelation, etc. In some embodiments, purge settings (e.g., if and/or when orders are purged) may be based on business context, user preferences, database settings, and/or other information (e.g., resource availability).

In some embodiments, OMS 100, OMS host server 102, OPE 120, or another entity may periodically or aperiodically perform order block related maintenance, e.g., in response to a period of time elapsing or after a purge process. For example, an order block data structure may include data entries, where each data entry may represent a unique range of order slot identifiers. In this example, as orders are completed or deemed inactive at different speeds, the order block data structure may become fragmented in that some data entries may have very small ranges of order slot IDs. Continuing with this example, to reduce fragmentation effects, OMS 100, OMS host server 102, OPE 120, or another entity may periodically or aperiodically perform order block related maintenance that includes modifying data entries to represent a larger range of order slot identifiers based on recently purged orders and/or consolidating data entries representing contiguous ranges of order slot identifiers into a combined data entry representing a combined range based on the contiguous ranges of order slot identifiers.

It will be appreciated that FIG. 1 is for illustrative purposes and that various nodes, their locations, and/or their functions described above in relation to FIG. 1 may be changed, altered, added, or removed. For example, some nodes and/or functions may be combined into one entity, e.g., OPE 120 or some functionality therein may be integrated with OMS host server 102 or other entities associated with OMS 100.

FIG. 2 is a diagram illustrating example database partitions 200-204 containing order data. Each of database partitions 200-204 may represent one or more data structures for storing order data. For example, database partitions 200-204 may be horizontal partitions managed by OMS 100, order database 128, or a related entity. In this example, the partitioning key is the order slot ID, and each of database partitions 200-204 store rows of order data associated with unique ranges of order slot IDs, e.g., partition 200 may store data associated with order slot IDs 1-1000000, partition 202 may store data associated with order slot IDs 1000,001-2000000, and partition 204 may store data associated with order slot IDs 2000,001-3000000.

In some embodiments, database partitions 200-204 may be accessed and/or modified by OMS 100, OMS host server 102, OPE 120, and/or another entity. In some embodiments, database partitions 200-204 or related information may be stored in order database 128, order cache 122, or another data storage unit using various data structures.

Referring to FIG. 2, each of database partitions 200-204 may include associations between ranges of order slot identifiers and other data identifiers. For example, a table representing database partitions 200-204 may comprise columns and/or fields for order slot IDs, order status indicators, order creation dates, and last order modification dates.

An 'order ID slot' field may comprise a value, a name, and/or a related identifier for indicating an order slot ID that acts a key or lookup value for related order data. For example, an order slot ID may represent a row or data location for storing order data for a particular order. In this example, the order slot ID may be reused in a database's lifetime and, as such, the order slot ID may not be capable of identifying a historical order without additional information, e.g., a recycle count and a block ID.

An 'order status' field may comprise a Boolean value, a name, and/or a related identifier for indicating whether a related order is completed. For example, an 'order status' field value may include a numeric value that represents an order status or state, e.g., inactive/closed/completed=7, open/running=4, etc. In another example, an 'order status' field value may include a Boolean value (e.g., 'True' or 'False') or other value (e.g., '1' or '0') that indicates whether the related order is completed or inactive and, as such, which order slot IDs can be recycled or reused. For example, OMS 100, OMS host server 102, OPE 120, or another entity may perform partition maintenance (e.g., a database purge process) periodically or aperiodically which may involve identifying completed or inactive orders so as to reclaim related order slot IDs for reuse. In this example, OMS 100, OMS host server 102, OPE 120, or another entity may search for completed or inactive orders by inspecting the 'order status' field for 'True' values when determining whether to notify an operator and/or which order slot IDs to reclaim for reuse.

In some embodiments, an 'order status' field or another data field (e.g., a completion or inactive date field) may include a date or related information for indicating when a related order was completed or deemed inactive. In such embodiments, OMS 100, OMS host server 102, OPE 120, or another entity may search for relevant dates that are after a last database purge date when determining whether to notify an operator and/or which order slot IDs to reclaim for reuse.

A 'creation date' field may comprise a date or other information for indicating when a related order was created. For example, a 'creation date' field value may include a timestamp (e.g., '04/06/2019 08:34:30') indicating when a related order was created. In this example, OMS 100, OMS host server 102, OPE 120, or another entity may perform partition maintenance periodically or aperiodically which may involve identifying stale or old orders so as to reclaim related order slot IDs for reuse. In this example, OMS 100, OMS host server 102, OPE 120, or another entity may search for old orders by inspecting creation dates when determining whether to notify an operator and/or which order slot IDs to reclaim for reuse.

A 'last modified date' field may comprise a date or other information for indicating when a related order was last modified or changed. For example, a 'last modified date' field value may include a timestamp (e.g., '05/02/2019 18:04:10') indicating when a related order was last modified or changed. In this example, OMS 100, OMS host server 102, OPE 120, or another entity may perform partition maintenance periodically or aperiodically which may involve identifying stale or old orders so as to reclaim related order slot IDs for reuse. In this example, OMS 100, OMS host server 102, OPE 120, or another entity may search for stale orders by inspecting last modified dates when determining whether to notify an operator and/or which order slot IDs to reclaim for reuse.

It will also be appreciated that database partitions 200-204 and related data therein are for illustrative purposes and that additional and/or different data than that depicted in FIG. 2 may be stored for order management purposes. Further, database partitions 200-204 and related data may be stored or managed using various data structures and/or computer readable media.

Figure 3:
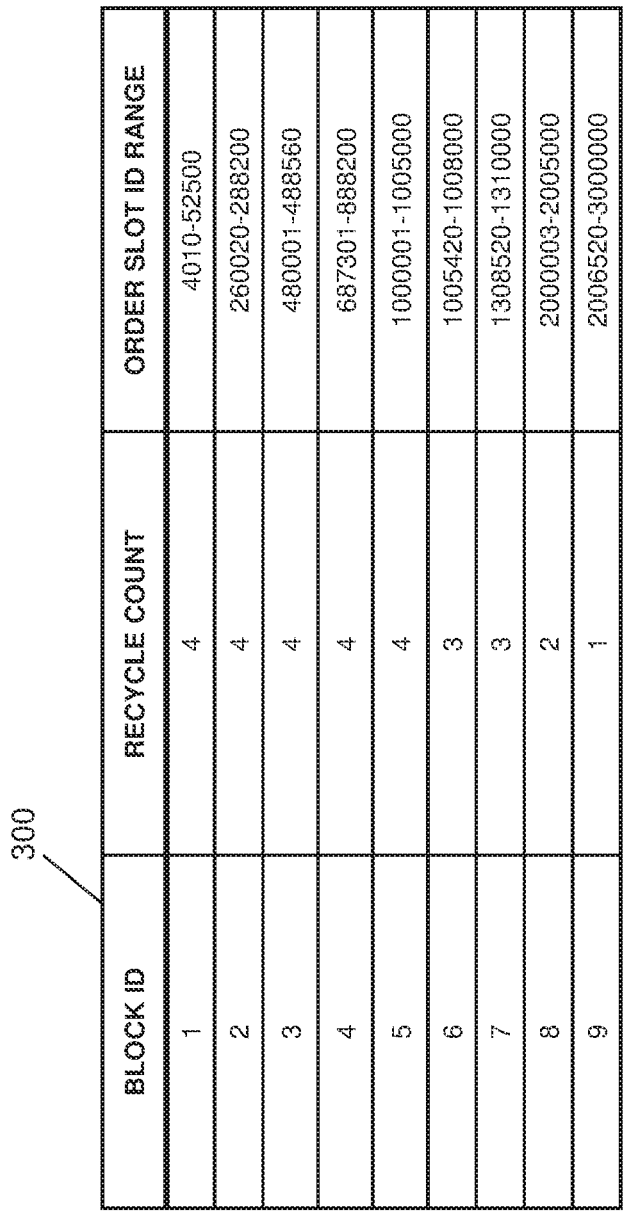
FIG. 3 is a diagram illustrating an example order block data structure.

FIG. 3 is a diagram illustrating an example order block 300. Order block 300 may represent one or more data structures (e.g., a table, a hash map, a data store, etc.) for storing data related to one or more of contiguous ranges of order slots 200-204. In some embodiments, order block 300 and/or related information may be accessed and/or modified by OMS 100, OMS host server 102, OPE 120, and/or another entity. In some embodiments, order block 300 or related information may be stored in order database 128, order cache 122, or another data storage unit using various data structures.

Referring to FIG. 3, order block 300 may include associations between ranges of order slot identifiers and other data identifiers. For example, a table representing order block 300 may comprise columns and/or fields for block IDs, recycle counts, and order slot ID ranges.

A 'block ID' field may comprise a value, a name, and/or a related identifier for indicating a consecutive or contiguous range of orders located within one or more database partitions 200-204. For example, a block ID '12' may identify an order ID slot range '4010-52500' within partition 200 and a block ID '15' may identify an order ID slot range '94010-1052500' that spans partitions 200-202. In another example, a block ID may be a unique name or character string, e.g., 'rng_1' may identify an order ID slot range '15400-67300', 'rng_2' may identify an order ID slot range '1926343-2578390', and 'rng_3' may identify an order ID slot range '2759010-2852500'.

A 'recycle count' field may comprise a value, a name, and/or a related identifier for indicating a number of times that a range of order slot identifiers has been used or reused. For example, a recycle count associated with a range of order slot identifiers may begin at '0' or '1'. After the range of order slot identifiers is used to store order data and then the order data is purged and the order slot identifiers are available for reuse, the corresponding recycle count may be incremented.

An 'order ID slot range' field may comprise a value, a name, and/or a related identifier for indicating a range of order slot IDs that are available for (re)use. In some embodiments, a range of order slot IDs may include one or more order slot IDs. For example, an order ID slot range may represent two or more sequential or contiguous order slot IDs, e.g., ID range '4010-52500'. In this example, the ID range is represented by a lowest order slot identifier in the range and a highest order slot identifier in the range separated by a dash or hyphen.

In some embodiments, OMS 100, OMS host server 102, OPE 120, or another entity may consult order block 300 to identify and select an available order slot ID (e.g., ID '2006520') from a particular range of order slot IDs (e.g., ID range '2006520-3000000'). In such embodiments, after selecting the order slot ID, OMS 100, OMS host server 102, OPE 120, or another entity may modify order block 300 to indicate that the selected slot ID is currently in use, e.g., by modifying a relevant data entry of order block to adjust an available ID range from '2006520-3000000' to '2006521-3000000'.

It will also be appreciated that order block 300 is for illustrative purposes and that additional and/or different data than that depicted in FIG. 3 may be usable for reusing or recycling database partitions. Further, order block 300 and related data may be stored or managed using various data structures and/or computer readable media.

Figure 4:
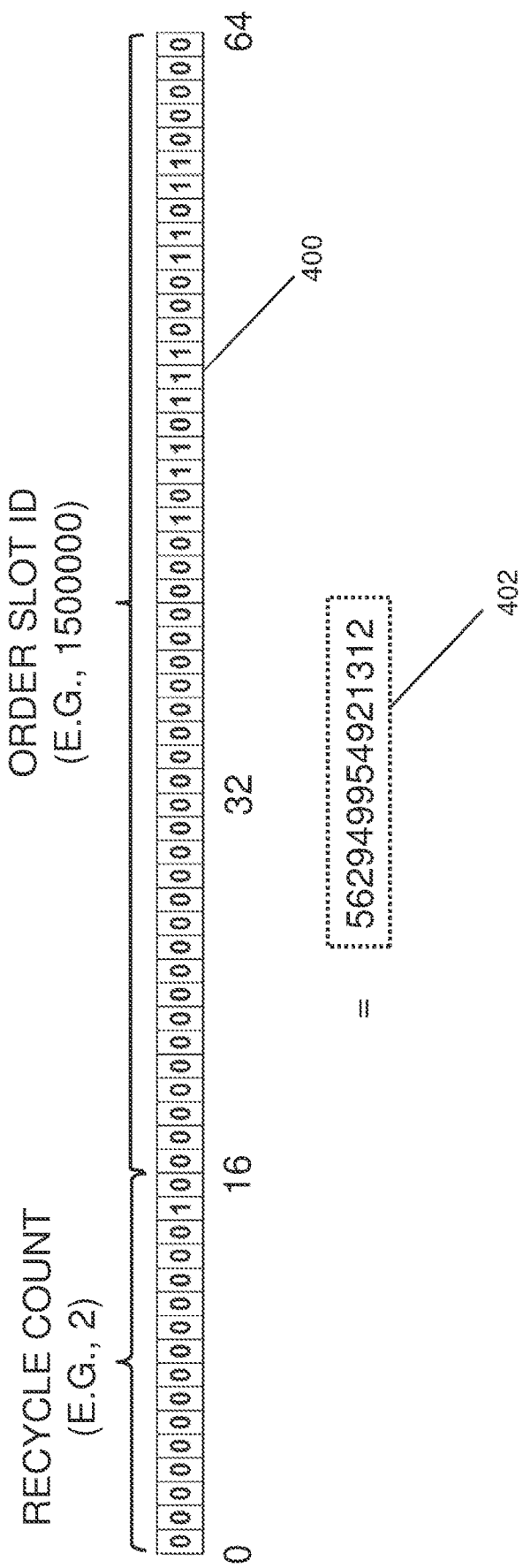
FIG. 4 is a diagram illustrating an example external order number.

FIG. 4 is a diagram illustrating an example external order number 402. Referring to FIG. 4, an external order number 402 may be a number (e.g., a positive integer) and may be derived or generated using the values of a block ID, a recycle count, and an order slot ID associated with a particular order. In some embodiments, e.g., where order number 402 is represented as a number, order number 402 may be provided to a requester as a 64-bit integer data type or in other suitable form.

In some embodiments, a 64-bit data representation 400 of order number 402 may include a 16-bit data representation of the recycle count (e.g., the 1st-16th bits of 64-bit data representation 400) associated with an order slot ID and a 48-bit data representation of the order slot ID (e.g., 17th-64th bits of 64-bit data representation 400). For example, for a particular order, a recycle count may be '2' which can be represented in 16-bit binary form as '0000000000000010'; and a related order slot ID may be '1500000' which can be represented in 48-bit binary form as '000000000000000000000000101101110001101100000'. In this example, 64-bit data representation 400 may be created by concatenating (in order) the 16-bit binary form of the recycle count and the 48-bit binary form of the order slot ID (e.g., '0000000000000010000000000000000000000000000000010110111000110110 0000') which in decimal form is order number 402 (e.g., '562949954921312).

In some embodiments, bit values of a block ID, a recycle count, and/or an order slot ID may be concatenated to generate 64-bit data representation 400. For example, 64-bit data representation 400 may be based on a concatenation of bit values of an order slot ID, a recycle count and a block ID. In this example, the order of concatenation, from most significant bits to least significant bits, may be block ID, recycle count, and order slot identifier. In this example, 64-bit data representation 400 of order number 402 may include a 16-bit data representation of the block ID (e.g., the 1st-16th bits of 64-bit data representation 400), a 16-bit data representation of the recycle count (e.g., the 17th-32nd bits of 64-bit data representation 400), and a 32-bit data representation of an order slot ID (e.g., 33rd-64th bits of 64-bit data representation 400).

In some embodiments, order number 402 may include non-numeric characters. For example, order number 402 may include numbers separated by one or more dashes or hyphens. In this example, assuming a recycle count is '5' and an order slot ID is '74563' for a particular order, corresponding order number 402 may be '5-74563'. In this example, order number 402 may be provided to a requester as a String data type or in other suitable form.

In some embodiments, order number 402 may be generated using order block 300 or other data. For example, OMS 100, OMS host server 102, OPE 120, or another entity (e.g., order cache 122) may cache order block 300 and use this cached information to automatically generate order number 402, e.g., by pre-pending a recycle count with separating dashes (e.g., '5-') to an order slot identifier (e.g., '74563') to yield order number 402 (e.g., '5-74563').

It will be appreciated that 64-bit data representation 400 and order number 402 are for illustrative purposes. It will also be appreciated that additional and/or different data types and/or bit values can be used to represent or generate order number 402. Further, it will be appreciated that various algorithms and/or criteria can be used in generating unique order numbers based on reusable order slot identifiers and various data described herein.

FIG. 5 is a flow chart illustrating an example process 500 for an example process for purging orders. In some embodiments, example process 500, or portions thereof, may be performed by or at OMS 100, OPE 120, OMS host server 102, and/or another node, module, or entity. In some embodiments, example process 500 may include steps 502, 504, and/or 506.

In step 502, orders may be purged from a database partition. For example, OMS 100, OMS host server 102, OPE 120, or another entity may schedule a purge process for one or more of database partitions 200-204, e.g., every Sunday at 2 a.m. Eastern time. In this example, the purge process may include backing up order data for completed or inactive orders and then removing the order data for the orders from database partitions 200-204. In some embodiments, OMS 100, OMS host server 102, OPE 120, or another entity may identify an order as completed by inspecting or querying a relevant data field (e.g., a Boolean based data field labeled 'Completed') in database partitions 200-204.

In step 504, a range of order slot IDs that is available for use may be identified. For example, during or after purging completed or inactive orders, OMS 100, OMS host server 102, OPE 120, or another entity may look for "big holes" in order block 300 (e.g., a large range of sequential order slot IDs) that are no longer being used to store data in database partitions 200-204.

In step 506, a data entry in an order block data structure may be created or modified to indicate that the range of order slot IDs is available for use, wherein the data entry includes a recycle count indicating the number of times that the range has been (re)used. For example, OMS 100, OMS host server 102, OPE 120, or another entity may create or update a data entry in order block 300 that represent an available range of order slot IDs. In this example, OMS 100, OMS host server 102, OPE 120, or another entity may increment (e.g., by 1) a related recycle count in the data entry, e.g., a recycle count '2' may represent that a range has been used two times previously or that its next usage will be the second time used.

In some embodiments, order block 300 may become fragmented over time. For example, in an embodiment with little to no defragmentation logic and after a number of purge operations, order block 300 may include many data entries, where each data entry may represent a less than optimal number of order slot IDs, e.g., a range of just one or a few order slot IDs.

In some embodiments, e.g., to minimize fragmentation effects, OMS 100, OMS host server 102, OPE 120, or another entity may be configured to create or generate data entries only if they can represent at least a minimum number of order slot IDs, e.g., one thousand or more sequential order slot IDs may be required.

In some embodiments, e.g., to minimize fragmentation effects, OMS 100, OMS host server 102, OPE 120, or another entity may be configured to perform defragmentation or related operations involving order block 300. For example, OMS 100, OMS host server 102, OPE 120, or another entity may combine data entries in order block 300 to create fewer numbers of data entries. In this example, a first range of IDs (e.g., ID range '5000-9999') represented by a first data entry of order block 300 may be identified that is contiguous to a second range of IDs (e.g., ID range '10000-19999') represented by a second data entry of order block 300. Continuing with this example, the first data entry and the second data entry may be combined into a single data entry representing the combined ranges (e.g., ID range '5000-19999').

It will also be appreciated that example process 500 is for illustrative purposes and that different and/or additional actions may be used. It will also be appreciated that various actions associated with example process 500 may occur in a different order or sequence.

FIG. 6 is a flow chart illustrating an example process 600 for recycling order identifiers. In some embodiments, example process 600, or portions thereof, may be performed by or at OMS 100, OPE 120, OMS host server 102, and/or another node, module, or entity. In some embodiments, example process 600 may include steps 602, 604, 606, and/or 608.

In step 602, an order slot ID may be selected, using an order block data structure, from a range of order slot IDs usable in a database partition of the order database, wherein the order slot ID is reusable. For example, OMS 100, OMS host server 102, OPE 120, or another entity may consult order block 300 to identify an available order slot ID (e.g., ID '2006520') from a particular range of order slot IDs (e.g., ID range '2006520-3000000').

In step 604, order data for an order may be stored in the database partition using the order slot ID. For example, OMS 100, OMS host server 102, OPE 120, or another entity may add (e.g., insert/update) order details for a new order into database partition 204 using ID '2006520' as the primary key.

In step 606, the order data may be purged in the database partition. For example, e.g., at a scheduled time, OMS 100, OMS host server 102, OPE 120, or another entity may purge records or data associated with completed or inactive orders from one or more of database partitions 200-204.

In step 608, the order block data structure may be periodically or aperiodically modified to indicate that the order slot ID is available for reuse, wherein the order block data structure indicates a recycle count associated with usage. For example, a recycle count may be based on a number of times that the range of order slot IDs (or an order slot ID therein) has been used.

In some embodiments, an order block data structure may represent or store data (e.g., available order slot IDs) associated with one or more database partitions. For example, order block 300 may include order slot IDs from database partitions 200-204. In another example, OMS 100 and/or other entities may utilize multiple order blocks, where each order block represents a contiguous range of order slot IDs associated with one or more database partition.

In some embodiments, an order block data structure may include data entries. In such embodiments, each data entry may represent a unique range of order slot IDs. In such embodiments, modifying the order block data structure to indicate that the order slot ID is available for reuse may include modifying a data entry that may be associated with the range of order slot IDs from which the order slot ID may be selected.

In some embodiments, modifying an order block data structure to indicate that the order slot ID is available for reuse may occur after a plurality of orders have been completed and after corresponding order data associated with the plurality of orders has been purged from a database partition.

In some embodiments, modifying an order block data structure to indicate that the order slot ID is available for reuse may include modifying a data entry to represent a larger range of order slot IDs based on recently purged orders or consolidating data entries representing contiguous ranges of order slot IDs into a combined data entry representing a combined range based on the contiguous ranges. For example, after purging one or more orders, OMS 100, OMS host server 102, OPE 120, or another entity may identify any large spaces or ranges of order slot IDs that are near (e.g., numerically adjacent or memory adjacent) the order slot IDs associated with the one or more purged orders. In this example, a first range of IDs (e.g., ID range '2000-3999') represented by a first data entry of order block 300 may be identified that is contiguous to a second range of IDs (e.g., ID range '4000-6999') represented by a second data entry of order block 300. Continuing with this example, the first data entry and the second data entry may be combined into a single data entry representing the combined ranges (e.g., ID range '2000-6999').

In some embodiments, a combined data entry of order block 300 based on combining two of more data entries may store a recycle count based on a common recycle count shared by the contiguous ranges of order slot IDs. For example, before combining a first data entry and a second data entry into a single data entry representing combined ranges of order slot IDs, OMS 100, OMS host server 102, OPE 120, or another entity may determine whether a first range of order slot IDs and a second range of order slot IDs has a same recycle count. In this example, if the contiguous ranges of order slot IDs do share a common recycle count, OMS 100, OMS host server 102, OPE 120, or another entity may consolidate the data entries representing the first and second ranges of order slot IDs into a combined data entry representing a combined range based on the contiguous ranges and storing the common recycle count. Continuing with this example, if the contiguous ranges of order slot IDs do share a common recycle count, OMS 100, OMS host server 102, OPE 120, or another entity may not consolidate the data entries.

In some embodiments, a combined data entry of order block 300 based on combining two of more data entries may store a recycle count based on a largest recycle count associated with any of the contiguous ranges of order slot IDs. For example, when combining a first data entry and a second data entry into a single data entry representing combined ranges of order slot IDs, OMS 100, OMS host server 102, OPE 120, or another entity may determine that a first range of order slot IDs is associated with a first recycle count and that a second range of order slot IDs is associated with a second recycle count. In this example, OMS 100, OMS host server 102, OPE 120, or another entity may determine that the recycle count associated with the combined data entry may be the larger of the first recycle count and the second recycle count. In another example, the recycle count associated with a combined data entry may be the smallest recycle count or may be determined based on other criteria.

In some embodiments, OMS 100, OMS host server 102, OPE 120, or another entity may provide an external order number to a requester, wherein the external order number may be determined using a related order slot ID and a related recycle count and, optionally, a related block ID. In some embodiments, an external order number may be based on a concatenation of the order slot ID and the recycle count and, optionally, a block ID. For example, a 64-bit value representing order number 402 may include a 16-bit value representing a corresponding block ID, a 16-bit value representing a corresponding recycle count, and a 32-bit value representing a corresponding order slot ID.

It will also be appreciated that example process 600 is for illustrative purposes and that different and/or additional actions may be used. It will also be appreciated that various actions associated with example process 600 may occur in a different order or sequence.

It will be appreciated that OMS 100, OMS host server 102, OPE 120, and/or functionality described herein may constitute a special purpose computer. Further, it will be appreciated that OMS 100, OMS host server 102, OPE 120, and/or functionality described herein can improve the technological field pertaining to order management systems by providing mechanisms and/or methods for recycling order identifiers, thereby improving resource utilization, e.g., reduced storage requirements and reduced storage/database maintenance.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for recycling order identifiers, the method comprising:

in an order management system that utilizes an order database, the order management system including at least one processor and a memory:

selecting, using an order block data structure, an order slot identifier from a range of order slot identifiers usable in a database partition of the order database, wherein the order slot identifier is reusable;

storing order data for an order in the database partition using the order slot identifier;

after storing the order data for the order and prior to purging the order data, providing an external order number to a requester, wherein the external order number is determined using the order slot identifier and the recycle count and, optionally, a block identifier;

purging the order data in the database partition; and modifying, periodically or aperiodically, the order block data structure to indicate that the order slot identifier is available for reuse, wherein the order block data structure indicates a recycle count associated with usage.

2. The method of claim 1 wherein the order block data structure represents data from one or more database partitions.

3. The method of claim 1 wherein the external order number is a concatenation of the order slot identifier and the recycle count and, optionally, the block identifier.

4. A method for recycling order identifiers, the method comprising:

in an order management system that utilizes an order database, the order management system including at least one processor and a memory:

selecting, using an order block data structure, an order slot identifier from a range of order slot identifiers usable in a database partition of the order database, wherein the order slot identifier is reusable;

storing order data for an order in the database partition using the order slot identifier;

purging the order data in the database partition; and modifying, periodically or aperiodically, the order block data structure to indicate that the order slot identifier is available for reuse, wherein the order block data structure indicates a recycle count associated with usage, wherein the order block data structure includes data entries, wherein each data entry represents a unique range of order slot identifiers and wherein modifying the order block data structure to indicate that the order slot identifier is available for reuse includes modifying a data entry that is associated with the range of order slot identifiers from which the order slot identifier is selected.

5. The method of claim 4 wherein the recycle count is based on a number of times that the range of order slot identifiers has been used.

6. The method of claim 4 wherein modifying the order block data structure to indicate that the order slot identifier is available for reuse occurs after a plurality of orders have been completed or deemed inactive and corresponding order data associated with the plurality of orders has been purged from the database partition.

7. The method of claim 6 wherein modifying the order block data structure to indicate that the order slot identifier is available for reuse includes modifying a data entry to represent a larger range of order slot identifiers based on recently purged orders or consolidating data entries representing contiguous ranges of order slot identifiers into a combined data entry representing a combined range based on the contiguous ranges of order slot identifiers.

8. The method of claim 7 wherein the combined data entry stores a recycle count based on a largest recycle count associated with any of the contiguous ranges of order slot identifiers or based on a common recycle count shared by the contiguous ranges of order slot identifiers.

9. A system for recycling order identifiers, the system comprising:

at least one processor;

a memory; and an order management system (OMS) that utilizes an order database, wherein the OMS is implemented using the at least one processor and the memory, wherein the OMS is configured for:

selecting, using an order block data structure, an order slot identifier from a range of order slot identifiers usable in a database partition of the order database, wherein the order slot identifier is reusable;

storing order data for an order in the database partition using the order slot identifier;

after storing the order data for the order and prior to purging the order data, providing an external order number to a requester, wherein the external order number is determined using the order slot identifier and the recycle count and, optionally, a block identifier;

purging the order data in the database partition; and modifying, periodically or aperiodically, the order block data structure to indicate that the order slot identifier is available for reuse, wherein the order block data structure indicates a recycle count associated with usage.

10. The system of claim 9 wherein the order block data structure represents data from one or more database partitions.

11. The system of claim 9 wherein the external order number is a concatenation of the order slot identifier and the recycle count and, optionally, the block identifier.

12. A system for recycling order identifiers, the system comprising:

at least one processor;

a memory; and an order management system (OMS) that utilizes an order database, wherein the OMS is implemented using the at least one processor and the memory, wherein the OMS is configured for:

selecting, using an order block data structure, an order slot identifier from a range of order slot identifiers usable in a database partition of the order database, wherein the order slot identifier is reusable;

storing order data for an order in the database partition using the order slot identifier;

purging the order data in the database partition; and modifying, periodically or aperiodically, the order block data structure to indicate that the order slot identifier is available for reuse, wherein the order block data structure indicates a recycle count associated with usage, wherein the order block data structure includes data entries, wherein each data entry represents a unique range of order slot identifiers and wherein modifying the order block data structure to indicate that the order slot identifier is available for reuse includes modifying a data entry that is associated with the range of order slot identifiers from which the order slot identifier is selected.

13. The system of claim 12 wherein the recycle count is based on a number of times that the range of order slot identifiers has been used.

14. The system of claim 12 wherein modifying the order block data structure to indicate that the order slot identifier is available for reuse occurs after a plurality of orders have been completed or deemed inactive and corresponding order data associated with the plurality of orders has been purged from the database partition.

15. The system of claim 14 wherein the OMS is configured for:

modifying a data entry to represent a larger range of order slot identifiers based on recently purged orders or consolidating data entries representing contiguous ranges of order slot identifiers into a combined data entry representing a combined range based on the contiguous ranges of order slot identifiers.

16. The system of claim 15 wherein the combined data entry stores a recycle count based on a largest recycle count associated with any of the contiguous ranges of order slot identifiers or based on a common recycle count shared by the contiguous ranges of order slot identifiers.

17. A non-transitory computer readable medium having stored thereon executable instructions that when executed by a processor of a computer cause the computer to perform steps comprising:

selecting, using an order block data structure, an order slot identifier from a range of order slot identifiers usable in a database partition of an order database, wherein the order slot identifier is reusable;

storing order data for an order in the database partition using the order slot identifier;

providing an external order number to a requester, wherein the external order number is determined using the order slot identifier and the recycle count and, optionally, a block identifier;

purging the order data in the database partition; and modifying, periodically or aperiodically, the order block data structure to indicate that the order slot identifier is available for reuse, wherein the order block data structure indicates a recycle count associated with usage.

18. The non-transitory computer readable medium of claim 17 wherein the order block data structure represents data from one or more database partitions.

* * * * *